United States Patent Office 3,037,428
Patented June 5, 1962

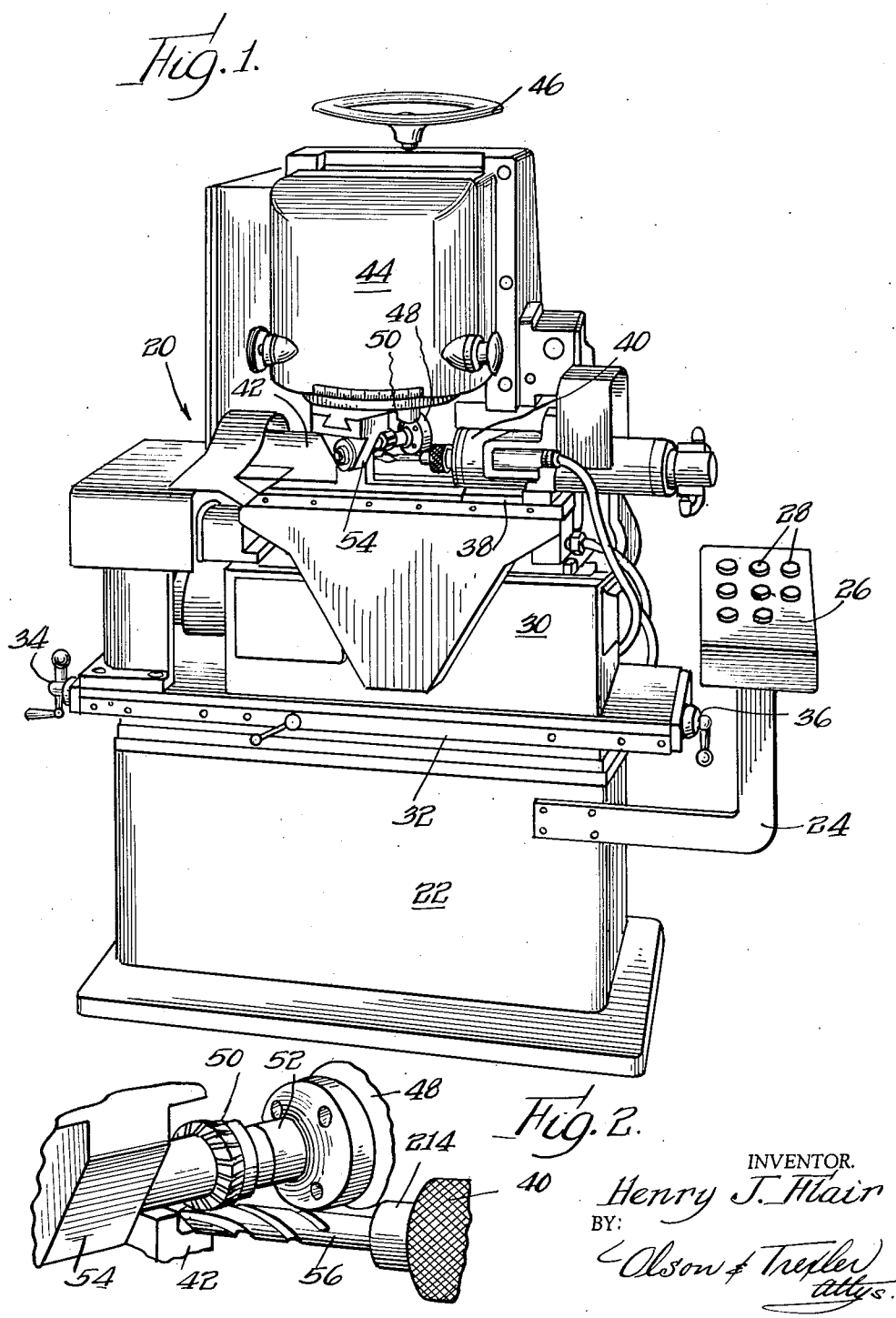

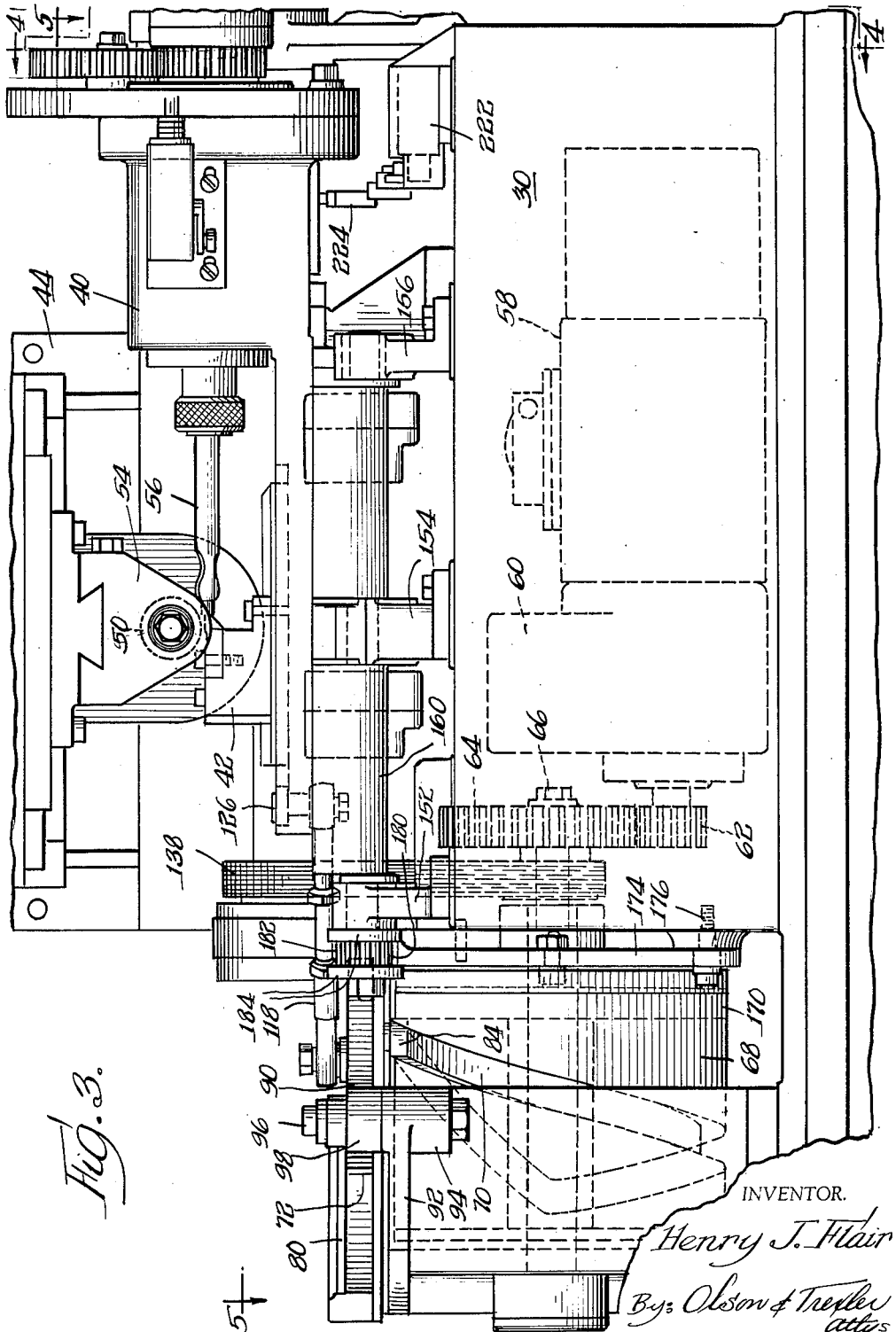

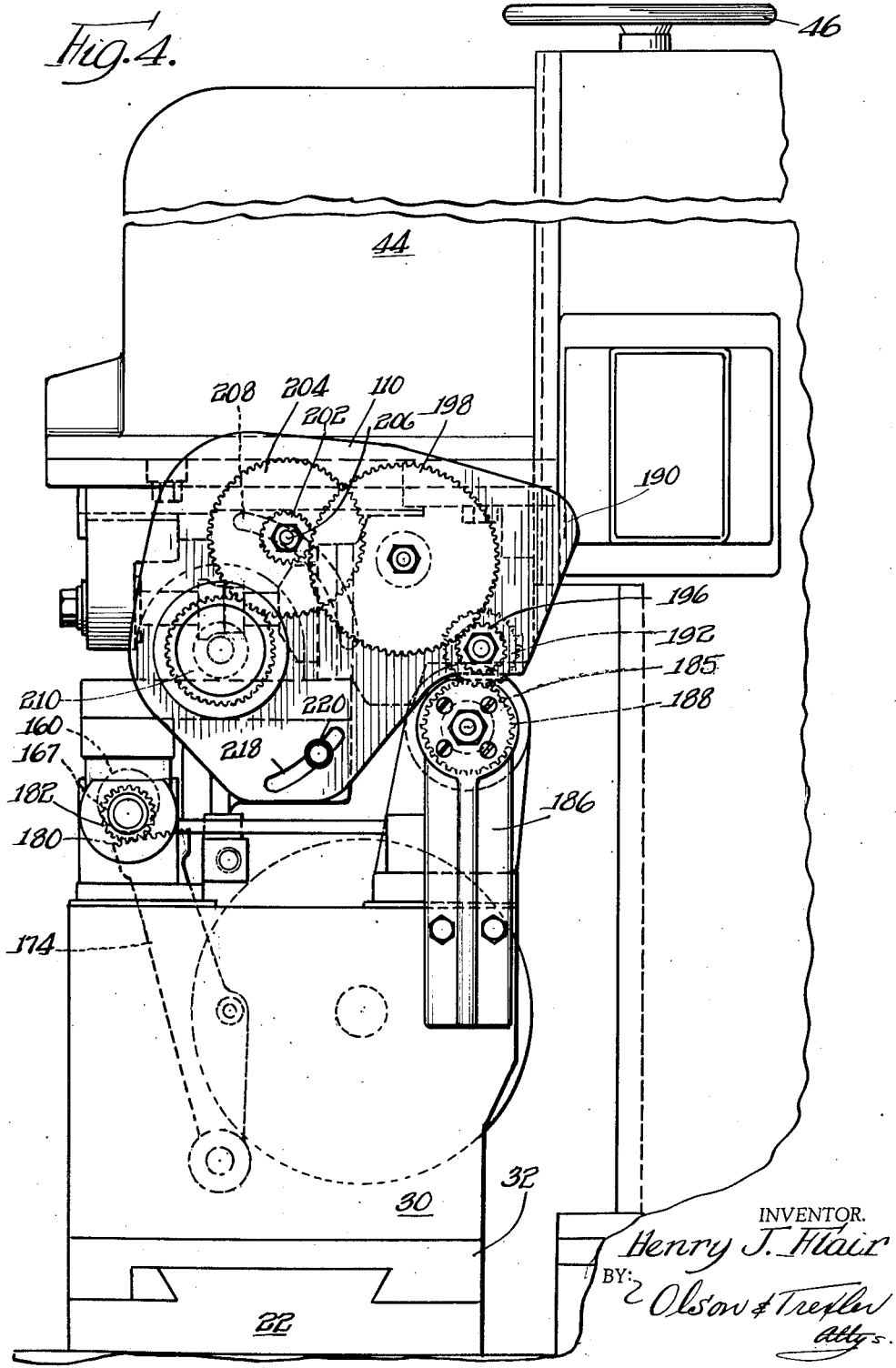

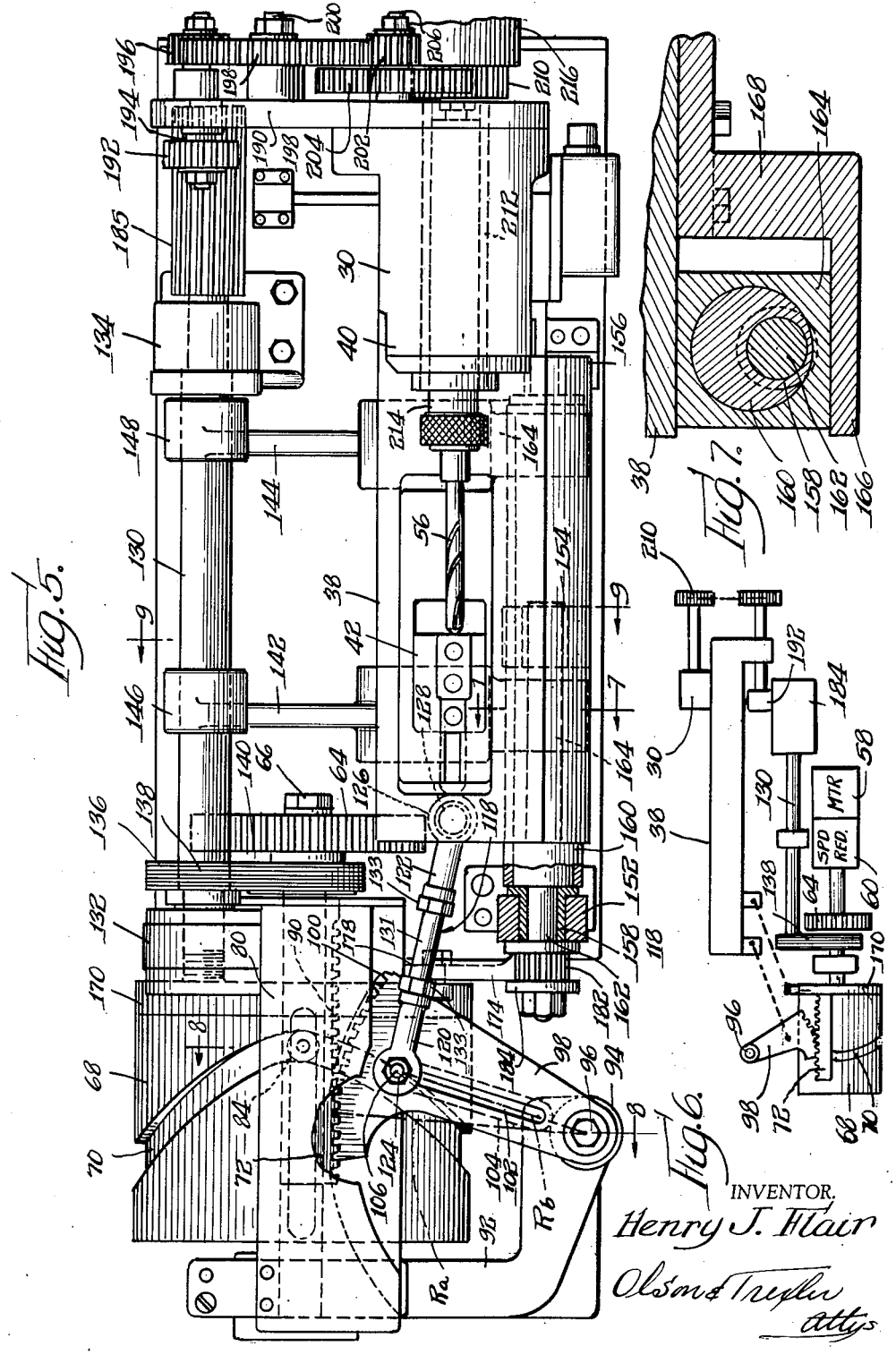

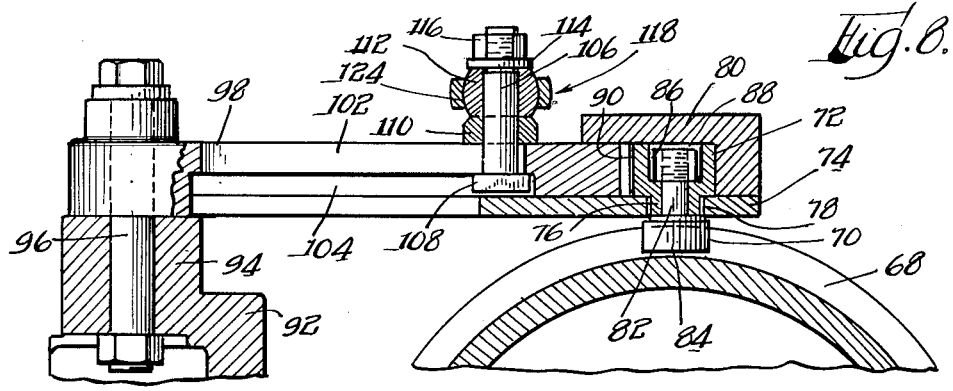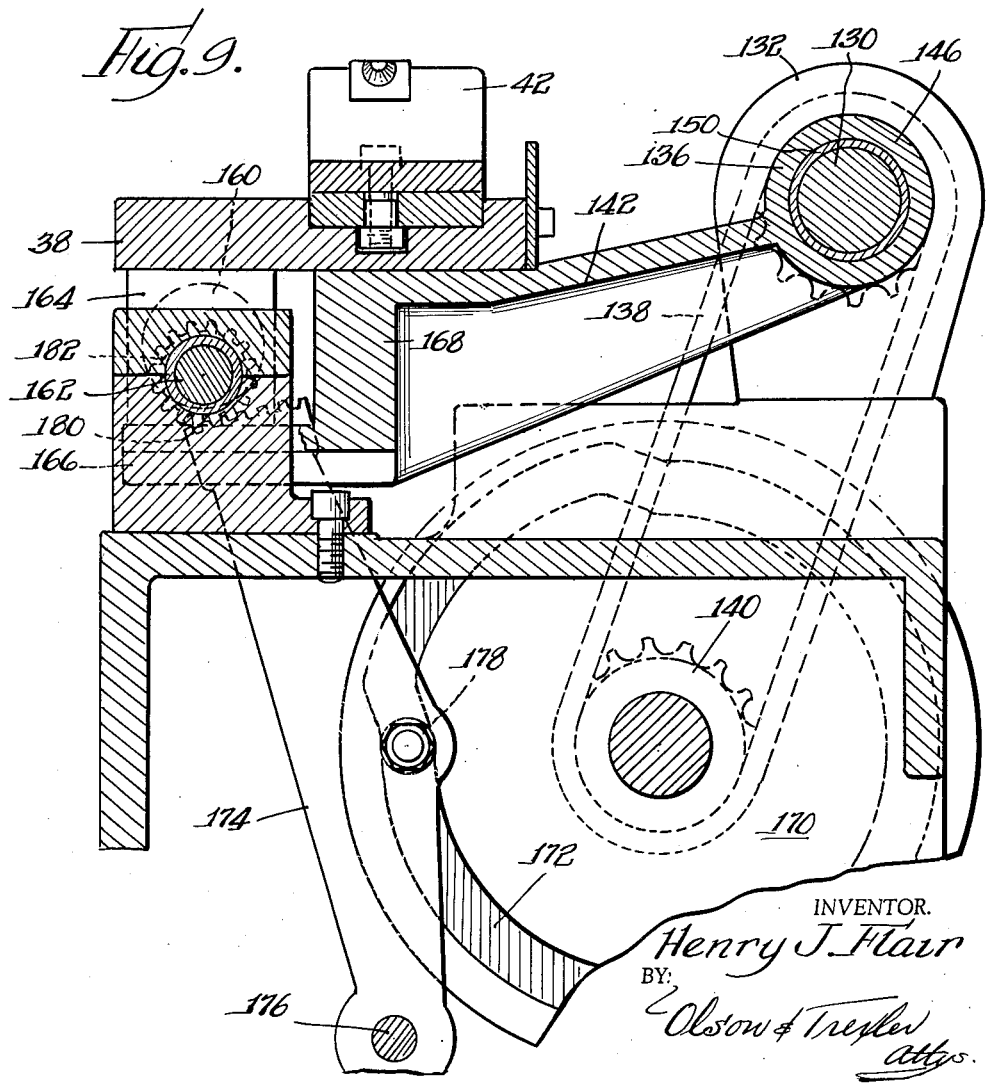

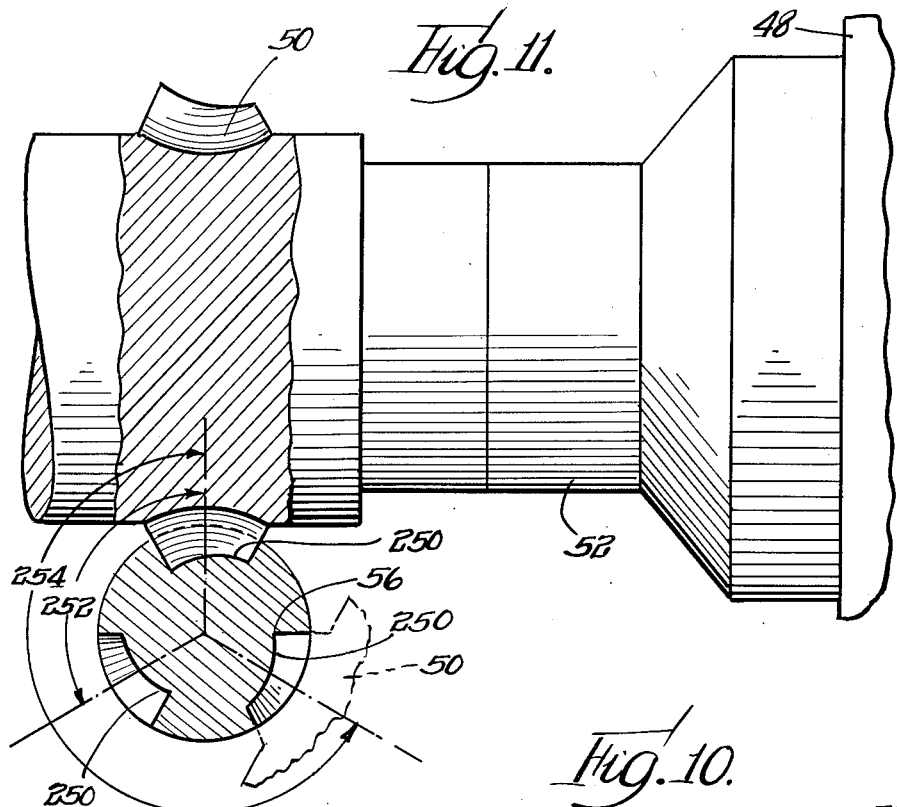
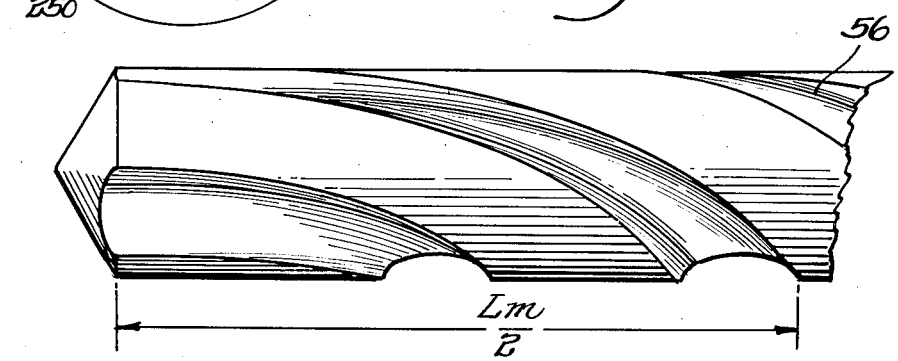
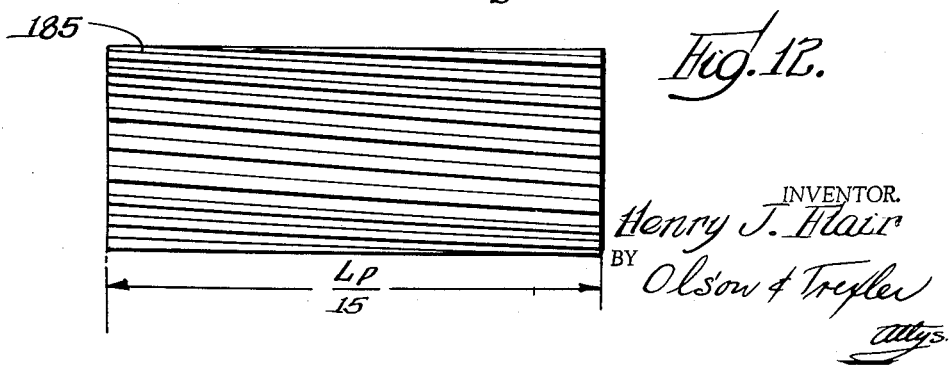

3,037,428
AUTOMATIC MILLING MACHINE
Henry J. Flair, Chicago, Ill., assignor to Illinois Tool Works, Chicago, Ill., a corporation of Illinois
Filed Apr. 16, 1957, Ser. No. 653,193
10 Claims. (Cl. 90—11.62)

This invention is concerned with the machine tool art, and more particularly with an automatic machine for making a plurality of circumferentially spaced helical cuts on a workpiece.

Automatic machines are known in the art, and are used for cutting helical gears, pinions, flutes in end mills, etc. In the production of fluted milling cutters, or other tools or gears on a standard milling machine, it is normal practice for the workpiece to be fed into a rotating milling cutter, while the workpiece is rotated about its axis in timed relation to the feed movement. Where more than one flute or the like is required in such a workpiece, the common practice is to lower the table on which the workpiece supporting parts, i.e. the head stock and the tail stock, are mounted, to return the table to its original position. By the use of suitable reversing means, the workpiece is commonly indexed to a position to begin the cutting of the next flute.

One object of the invention is to provide an improved automatic machine tool in which a workpiece is driven continuously in one direction to make on the workpiece a plurality of circumferentially spaced helical cuts having a lead that can be predetermined selectively within a substantial range of lead values without incurring substantial costs for special machine parts.

A more specific object is to provide an automatic machine tool as recited in the preceding object which operates to make on a workpiece successive circumferentially spaced helical cuts having a predetermined lead that can be infinitely adjusted to conform accurately to any desired value within a substantial range of lead values.

It is another object of this invention to utilize a common member for transmitting power to the head stock of an automatic milling machine and for supporting the table on which the head stock is mounted.

More particularly, it is an object of this invention to provide an automatic milling machine wherein the table is mounted for pivotal movement about a drive shaft for the head stock.

Other and further objects and advantages of the present invention will be apparent from the following description when taken in connection with the accompanying drawings, wherein:

FIG. 1 is a perspective view of an automatic milling machine constructed in accordance with the principles of the invention;

FIG. 2 is an enlarged perspective view showing the cutter and work part;

FIG. 3 is a side elevational view of the machine;

FIG. 4 is an end view thereof as taken from the right end of FIG. 3 and indicated by the line 4—4 in FIG. 3;

FIG. 5 is a top view of a part of the machine as taken substantially along the line 5—5 in FIG. 3;

FIG. 6 is a somewhat schematic diagram showing the layout of the drive train;

FIG. 7 is a vertical sectional view as taken along the line 7—7 in FIG. 5;

FIG. 8 is a fragmentary sectional view as taken along the line 8—8 in FIG. 5;

FIG. 9 is a cross sectional view as taken along the line 9—9 in FIG. 5;

FIG. 10 is a longitudinal side view of a longitudinal segment of a workpiece;

FIG. 11 shows the workpiece in transverse section and illustrates in solid lines the positional relationship to the workpiece of the cutter during one cutting stroke and also illustrates in phantom lines the positional relationship to the workpiece of the cutter during the succeeding cutting stroke; and FIG. 12 is a longitudinal side elevational view of an elongated pinion used in the workpiece rotating transmission of the machine.

Much of the automatic milling machine associated with the novel features of my invention is of conventional construction. Thus, referring to FIG. 1, there is shown a milling machine identified generally by the numeral 20. The milling machine includes a pedestal 22 on which there is mounted a frame 24 carrying a control panel 26 having appropriate push buttons 28 thereon. An intermediate base 30 is adjustably mounted on the pedestal 22 by means of dovetails or the like, as at 32, and suitable mechanism is provided for adjusting and locking the intermediate base on the pedestal, as at 34 and 36. The intermediate base carries a table 38, and the subject matter of this invention is mostly concerned with the table, as will be set forth hereinafter. A head stock 40 is carried by the table, as is a tail stock 42. A head 44 is carried above the table in the usual manner, and is provided with suitable means as at 46 for raising and lowering the head.

As shown in detail in FIG. 2, the head 44 carries a hydraulic motor 48, and a milling cutter 50 or the like is mounted on an arbor or shaft 52 extending between the motor 48 and a journal 54 adjustably mounted on the head. A workpiece 56 is mounted between the head stock 40 and the tail stock 42 for cutting by the milling cutter 50.

Referring now to FIG. 3, a motor 58 is housed within the intermediate base 30, and acts through a speed reducer 60 to drive an output pinion 62. The pinion, in turn, drives a gear 64 mounted on a shaft 66 (see also FIG. 5). A barrel cam 68 is mounted on the shaft 66 for rotation therewith, and is provided with a circumferential cam groove 70.

A rack 72 is reciprocably mounted on a fixed plate 74 (FIG. 8) above the cam 68, and has a portion 76 depending through a slot 78 in the plate. An angle shaped retainer 80 overlies the rack for locating the same.

A stud 82 extends downwardly through the rack 72 and depending portion 76, and rotatably carries a cam follower 84, received in the cam groove 70. A nut 86 is threaded onto the upper end of the stud 82 within a counterbore 88 in the rack 72. The rack 72 is provided along the free edge thereof with rack teeth 90.

An L-shaped arm 92 extends forwardly from a part of the frame of the intermediate base, and is provided at its outer end with a boss 94 holding a stud 96 on which there is pivoted a lever 98. The lever is formed at its outer end with a toothed gear segment 100 meshing with the rack teeth 90.

The lever 98 is provided with a slot 102. This slot is not radial, and may be non-radial as shown, or kidney shape. As will be apparent later, the table is moved through a connection to this slot, and the non-radial slot reduces what is called the height of arc brought about due to sinusoidal velocity curve of the table stroke derived from the particular mechanical movement of the cam, rack, sector gear and crank. When a radial slot is used, a great variety of barrel cams is required for different operations. The important thing is that a variable stroke is provided for the table for a single cam.

The aforesaid slot 102 is undercut at 104, and an inverted T-shaped stud 106 having a head 108 thereon is received in the slot 102 with the head in the undercut 104. A spacer 110 fits over the stud above the top of the lever 98, and a bearing 112 is provided above the spacer. A washer 114 and nut 116 surmount the bearing, and the stud 106 is adjustable in the slot 102 by loosening of the nut 116. The stud 106 constitutes a crank pin, and a connecting rod 118 is pivotally mounted over the bearing 112.

The connecting rod 118 comprises a pair of shanks 120 and 122 having eyes 124 and 126 thereon. The eye 124 is mounted on the bearing 112, the eye and bearing having complementary concave and convex surfaces, and the eye 126 being mounted on a pin or stud 128 on the table 38 for reciprocating the table. A shank 131 is threadedly interconnected with the shanks 120 and 122, and jam nuts 133, are provided for locking the shank 131 in adjusted position, whereby the length of the connecting rod 118 can be varied.

A spindle 130 (FIGS. 5 and 9) is rotatably journalled in supports 132 and 134 upstanding from portions of the machine frame. The spindle is provided adjacent its left end (as viewed in FIG. 5) with a sprocket 136, and a sprocket chain 138 passes over this sprocket, and over a sprocket 140 on the shaft 66 carrying the barrel cam 68, and driven by the gear 64.

The table 38 is provided with a pair of rearwardly projecting outrigger arms 142 and 144 having bosses 146 and 148 on the outer ends thereof. These bosses are provided with sleeve bearings as at 150 (FIG. 9) receiving the spindle 130. The arms 142 and 144 thus support the rear portion of the table from the spindle 130 with the table movable up and down with a pivotal movement about the spindle 130.

Referring now to FIGS. 3 and 5, there will be seen three upstanding supports 152, 154, and 156 on the forward edge of the intermediate base. These supports are provided with bearings, as at 158, and eccentrically support a shaft 160. The eccentric portions of the shaft received in the bearings are identified by the numeral 162, and referring additionally to FIGS. 7 and 9, it will be seen that bearing blocks 164 are carried by the main portions of the shaft 160. Such bearing blocks conveniently are made of bronze, and underlie the forward edge of the table 38. Flanges 166 on downward projections 168 at the inner ends of the outrigger arms underlie the bearing blocks securely to hold them in position against the underside of the table 38. However, as will be observed, the blocks are spaced horizontally from the downward projections 168, whereby to allow horizontal shifting of the blocks. Means is provided for rocking the shaft 160 eccentrically back and forth about the pivots 162, and as will be apparent this causes raising and lowering of the blocks 164. Accordingly, the front edge of the table is moved up and down, with the table pivoting about the spindle 130 by virtue of support through the outrigger arms 142 and 144.

On the inboard end of the barrel cam 68, there is provided a face type cam 170, FIGS. 3, 5 and 9. This cam conveniently is integral with the barrel cam, and is provided with a cam track 172. A lever 174 is pivoted at its lower end on a pin 176 fixed in the machine frame, and is provided intermediate its ends with a cam follower roller 178 received in the cam track 172. The lever 174 is formed at its upper end with a gear sector having gear teeth 180 thereon. The teeth 180 of the gear sector at the upper end of the lever arm 174 mesh with a spur gear 182 fixed on the end of the rock shaft 160 and concentric with the pivotal mounting sections 162. Collars 184 are provided on opposite sides of the gear 182 accurately to locate the upper end of the lever 174. The cam track 172 is designed so that during one rotation of the cams 168 and 170, the rock shaft will be slowly pivoted for rocking in one direction to raise the front end of the table slowly. After the cams have made substantially one complete revolution, the lever 174 is returned to its initial position rather rapidly, whereby to rock the rock shaft in the opposite direction and consequently to lower the front edge of the table.

Referring now primarily to FIG. 5, and also to FIGS. 3 and 4, there will be seen an elongated pinion 185 fixed on the spindle 130 for rotation therewith. A supporting arm 186 upstanding from the intermediate base 30 provides an additional bearing 188 for the spindle 130 outwardly of the elongated pinion 185.

A plate 190 extends rearwardly from the table 38 and a gear 192 of short axial extent meshes with the elongated pinion 185 and is fixed on a shaft 194 journalled in the wall 190. At the other end of the shaft 194 there is provided a gear 196 meshing with a larger gear 198 rotatably mounted on a stud 200 carried by the wall 190. The gear 198 meshes with a relatively small gear 202 fixed for rotation with a gear 204. These latter two gears are mounted on a stud 206 adjustably mounted in an arcuate slot 208 for obtaining proper meshing when gears of different sizes are used. The gear 204, in turn, meshes with a gear 210 which drives a hollow work spindle 212 in the head stock 30. The center or chuck shaft 214 for holding the work is rotatable with the hollow work spindle 212, and is axially shiftable by means of a hydraulic mechanism 216 of conventional design which is used for setting up the machine with a new workpiece between the head stock and tail stock.

The plate 190 is rotatable about the axis of the gear 210 to a limited extent, and to this end an arcuate slot 218 and a cap screw or the like 220 are provided. Upon proper pivoting or rotation of the plate 190, with corresponding movement of the gears 202 and 204 by virtue of the slot 208, various gears of different sizes can be incorporated in the gear train, or a reversing gear in the form of an idler can be connected in the gear train.

The drive connections as just described are shown schematically in FIG. 6, and are laid out somewhat displaced from their normal positions. From the foregoing description, and from the schematic showing of FIG. 6, it will be seen that all parts are positively driven in timed relation from the same power source. Thus, rotation of the cam 68, and subsequent reciprocation of the rack 72 and rocking of the lever 98 acts through the connecting rod 118 to reciprocate the table longitudinally, the table sliding on the spindle 130 and on the blocks 164 carried by the eccentric shaft 160. At the same time, the spindle 130 is driven in synchronism with the foregoing parts by virtue of the chain 138 and the sprockets over which it is passed. Accordingly, the elongated pinion 185 acts through the gear train to drive the head stock 30 rotationally in timed relation with the advance thereof as effected by reciprocation of the table. As will be understood, during such longitudinal reciprocation of the table the gear 192 simply slides along the pinion 185, while remaining in driving engagement therewith. At the same time, the face cam 170 acts through the lever 174 and the gear segment 180 and gear 182 to rock the eccentric rock shaft 160 eccentrically, thereby raising the table as the table is advanced by the connecting rod 118, and subsequently lowering the table as the table is returned to its initial position of reciprocation.

Thus, the longitudinal movement of the table, and consequently of the head stock and the workpiece, the raising and lowering of the table, and the rotation of the workpiece all are positively effected in proper timed relation.

It is important to note that the cutter 50 is driven independently of the foregoing parts, and rotates continuously. Accordingly, more rapid cycling is possible since there is no time lag waiting for the cutter to come up to cutting speed.

In the operation of the machine, the lead of the workpiece is determined by the longitudinal movement of the table and the rotation of the head stock. These two factors in turn are controlled by the barrel cam 68 and the change gears meshing with the elongated pinion and driving the head stock work spindle. The elongated pinion can be helical, if so desired, and if so the lead $LP$ thereof, FIG. 12, becomes another factor entering into the computation of the lead of the workpiece. Indexing is obtained by the change gears only. For one revolution of the cam shaft, the table is advanced to a cutting operation, and is returned to its initial position. All rotation due to the lead of the change gears during the lowering and raising of the table has been added and subtracted the same amount. The relation between the head stock and the main cam shaft, or the revolutions of the head stock for one revolution of the cam shaft is equal to $$\frac{K}{N_f}$$

where $N_f$ is equal to the number of flutes.

For $K<N_f$: Then $K=$ any whole number not a factor of $N_f$

For $K>N_f$: Then $$\frac{K}{N_f} = \text{any whole number} + \frac{R}{N_f}$$

where $R=$ any whole number not a factor of $N_f$

It will be obvious from the foregoing explanations and equations that if K were equal to $N_f$ the head stock would turn one revolution each time the main cam turned one revolution. If this were the case only one flute or cut would be generated on the workpiece. If K or R were not unity and were a factor of $N_f$, then the machine would not generate the desired number of circumferentially spaced cuts or flutes but would repeat its cutting action on some cuts to produce a smaller overall number of cuts.

In the machine described, the rotary shaft 66 and the barrel cam 68 constitute components of cycling means which operate in the manner described to move the head stock 40 through successive operating cycles, each of which carries a workpiece supported by the head stock through a feeding stroke in relation to the cutter 50. The cam shaft 66 turns through a complete revolution during each successive operating cycle of the cycling means. It will be understood from the physical relationships previously described that upon completion of each successive revolution of the cam shaft 66, the rotary head stock which supports a workpiece is displaced rotatably through a rotary or radial angle from the rotary position occupied by the head stock at the end of the preceding revolution of the cam shaft 66. Moreover, the rotary or radial angle between the rotary positions occupied by the work supporting head stock upon completion of successive rotations of the cam shaft is equal to or a multiple of the rotary or radial angle between adjacent flutes or cuts to be formed on the workpiece. This is true even though the head stock may turn through more than a complete revolution during each operating cycle of the machine. Thus in turning continuously in one direction, the head stock or work supporting element has a cumulative rotary displacement which differs from a whole number of complete revolutions by a rotary or radial angle which is equal to or a multiple of the angular or rotary spacing between adjacent cuts of the series of cuts to be made on the workpiece.

Further, the barrel cams generally utilized are made in such a manner that the stroke of the table is equal to ¾ of the lead of the cam forward (i.e. stroke=¾$L_{cf}$) during cutting cycle. The remaining ¼ rotation is utilized to return the table.

As illustrated in FIGS. 10 and 11, the workpiece 56 is milled by helical cuts to define three helical flutes 250 evenly spaced circumferentially around the workpiece. Each flute 250 is circumferentially spaced from each of the adjacent flutes by a radial angle which is identified in FIG. 11 by the number 252. This radial angle is the angular spacing between adjacent flutes.

The radial angle through which the workpiece 56 is rotated in relation to the cutter 50 during a single operating cycle of the machine is identified in FIG. 11 by the number 254. The position of the tool relative to the workpiece at the beginning of one feeding stroke is shown in solid lines in FIG. 11, in which the position of the tool relative to the workpiece at the beginning of the next feeding stroke is indicated in phantom lines.

For the purpose of illustration, the tool 50 is displaced relative to the workpiece through a radial angle 254 equal to twice the angular spacing between adjacent flutes. Hence in making successive helical cuts in successive operating cycles, the cutter 50, in this instance, skips a flute between the flutes in which successive cuts are made. It will be appreciated that the cutter is displaced circumferentially relative to the workpiece by rotation of the workpiece as described.

In the selection of change gears, to control rotation of the workpiece to index same, and the selection of the elongated pinion and cam, the following formula is used:

$$\frac{N_f}{K \times L_m} = \frac{1}{L_{cf}} \pm \frac{1}{L_p}$$

Where:

$N_f=$ Number of flutes
$K=$ Any whole number not a factor of $N_f$
$L_m=$ Lead milled in workpiece (see FIG. 10).
$L_{cf}=$ Lead of barrel cam forward when the lever arms actuating the table are set at a 1:1 ratio
$L_p=$ Lead of elongated pinion—right hand +; left hand —

The above equations are based on the condition that the lever arms actuating the table are set at a 1:1 ratio. However, utilizing a different lever setting enables the machine to have two important additional features:

First, utilizing the smallest table travel to mill a groove of relatively short length. This means the lead milled equals $$L_m = \frac{N_f}{K\left(\dfrac{1}{L_{cf}\dfrac{R_a}{R_b}} \pm \dfrac{1}{L_p}\right)}$$

where $$\frac{R_a}{R_b}$$

equals the ratio of lever arms setting ($R_b=$ distance from center of pivot 96 to rack 72, $R_a=$ distance from center of pivot 96 to center of pivot 106, see FIG. 5). For high production jobs where time per piece is important, the term $$\left(L\frac{R_a}{R_b}\right)$$

would be held to a minimum, and a special pinion with lead $L_p$ would be used to satisfy the lead to be milled.

The second feature offers more flexibility in the lead milled. A small production run could utilize the closest available pinion $L_p$ which had been left over from a previous job, or which constituted a portion of the tooling for the machine. The table traveled could then be lengthened into over-travel and a change in lever setting $$\frac{R_a}{R_b}$$

made to satisfy the correct lead milled per the equation $$L_m = \frac{N_f}{K\left(\dfrac{1}{L_{cf}\dfrac{R_a}{R_b}} \pm \dfrac{1}{L_p}\right)}$$

One further feature worthy of note is shown in FIG. 3, wherein there is provided a limit switch 222 operable by suitable mechanism 224 associated with the head stock for stopping the machine after a workpiece has been completely cut.

The specific example of the invention as herein shown and described is to be understood as being for illustrative purposes only. Various changes in structure will no doubt occur to those skilled in the art, and are to be understood as forming a part of the invention insofar as they fall within the spirit and scope of the appended claims.

The invention is claimed as follows:

1. A machine comprising a frame, a rotating shaft horizontally carried by said frame, a table, bearing means carried by said table relatively adjacent one side thereof, said bearing means bearing on said shaft for supporting the table adjacent said one side, support means supporting said table relatively adjacent the opposite side, rotary work holding means mounted on said table, means driving said rotary work holding means from said shaft in timed relation thereto, a working tool supported from said frame adjacent said work holding means for working on a workpiece held thereby, means for horizontally moving said table in the direction of said shaft from a rest position and back to said rest position in a predetermined cycle in timed relation to the rotation of said shaft, means including an eccentric for raising and lowering said support means to rock said table up and down about said shaft, a gear for turning said eccentric, a lever having a gear segment thereon meshing with said gear, and a cam operated in timed relation to the rotation of said shaft for moving said lever back and forth whereby to effect up and down movement of said table in timed relation to the rotation of said shaft.

2. A machine as set forth in claim 1 wherein the means for horizontally moving the table comprises a cam operated in timed relation to the first mentioned cam, a rack reciprocated by said last mentioned cam, a lever having a gear segment thereon meshing with said rack and pivoted thereby, and a connecting rod connected to said lever and to said table.

3. A machine as set forth in claim 2 wherein the connecting rod is connected to the lever by means of a pin received in a non-radial slot in the lever.

4. A machine comprising a frame, a table mounted for horizontal movement on said frame, work holding means mounted on said table, a working tool supported from said frame adjacent said work holding means for working on a workpiece held thereby, a cam, means for operating said cam and for rotating said work holding means in only one direction in timed relation, a rack oscillated by said cam in accordance with a predetermined pattern, a pivotally mounted lever having a gear sector thereon meshing with said rack, and a connecting rod linking said lever to said table for reciprocating said table.

5. A machine as set forth in claim 4 wherein the connecting rod is connected to the lever by means of a pin received in a non-radial slot in said lever.

6. An automatic machine for making a series of circumferentially spaced cuts of generally helical shape on a workpiece, comprising, in combination, a tool positioning element, a rotary work positioning element, means mounting one of said positioning elements for translation relative to the other element, a rotary drive, a rotary cam connected to said drive to be continuously rotated by the latter, a cam follower engaging said cam and coacting with said one positioning element to effect movement of the latter through successive operating cycles each of which translates said one element from a starting position through a feeding stroke followed by a return stroke to said starting position, a work rotating drive continuously connected to said rotary drive and to said rotary work positioning element to continuously rotate the latter in one direction, said work rotating drive having an output speed ratio relative to said rotary drive which is correlated with the shape of said cam to predetermine the lead in the cut made on a workpiece during a feeding stroke and which effects during an operating cycle a cumulative rotary displacement of said work positioning element which differs from a predetermined number of complete revolutions of the work positioning element by a radial angle which is equal to or a multiple of the angular spacing between adjacent cuts to be made on the workpiece, said unidirectional drive including first and second gears mating with each other for transmitting rotary motion to said work positioning element, means connecting said cycling means to said first gear for reversibly translating the latter relative to said second gear in a direction parallel to the axis of said second gear in synchronism with the translation of said one positioning element, one of said gears being elongated sufficiently to have continuous engagement with the other of said gears for all positions of said one element; said one gear being readily replaceable and having a helical lead which effects, as an incident to translation of said first gear relative to said second gear, a rotary displacement of said gears relative to each other which is transmitted to said work positioning element to effect in the cut made in a workpiece a variation in the lead of the cut with reference to the cut lead predetermined by said cam; and shifting means operated in timed relation to said rotary drive and connected with one of said positioning elements to effect positioning of the latter in a cutting position relative to the other element during each feeding stroke and to effect displacement of said elements relative to each other out of a workpiece cutting relationship to each other during each return stroke.

7. A machine for making a circumferentially spaced series of generally helical cuts on a workpiece, comprising, in combination, a tool positioning element, a rotary work positioning element, means supporting one of said positioning elements for translation relative to the other element, cycling means connected to said one positioning element to translate the latter through successive operating cycles relative to the other positioning element in which said one element is moved from a starting position through a feeding stroke and returned to the starting position, unidirectional drive means positively synchronized with said cycling means and connected to said rotary work positioning element to rotate the latter continuously in one direction throughout each successive cycle of said cycling means, said unidirectional drive including first and second gears mating with each other for transmitting rotary motion to said work positioning element, means connecting said cycling means to said first gear for reversibly translating the latter relative to said second gear in a direction parallel to the axis of said second gear in synchronism with the translation of said one positioning element, one of said gears being elongated sufficiently to have continuous engagement with the other of said gears for all positions of said one element; said one gear being readily replaceable and having a helical lead which effects, as an incident to translation of said first gear relative to said second gear, a rotary displacement of said gears relative to each other which is transmitted to said work positioning element; and said unidirectional drive having an output motion which is related to the motion of said cycling means to effect a cumulative rotary displacement of said rotary work positioning element during each cycle of said cycling means which differs from a predetermined number of complete revolutions of said rotary work positioning element by an angle which is a proper fraction of a single revolution in which fraction the denominator is the number of the cuts in the circumferentially spaced series of cuts to be made on the workpiece and the numerator is one or a number not a factor of the denominator.

8. An automatic milling machine for milling a series of circumferentially spaced cuts of generally helical shape on a workpiece, comprising, in combination, a tool positioning element, a rotary work positioning element, means mounting one of said positioning elements for translation relative to the other element, a reciprocable actuator connected to said one positioning element for translating the latter reversibly, an oscillatable element supported for pivotal movement about a pivotal axis thereof, a connecting link pivotally connected between said reciprocable actuator and said oscillatable element, a rotary drive, a rotary cam connected to said drive to be continuously rotated by the latter, a cam follower engaging said cam and coacting with said oscillatable element to effect movement of said one positioning element through successive operating cycles each of which translates said one positioning element from a starting position through a feeding stroke relative to said other positioning element followed by a return stroke to said starting position, a work rotating drive connected to said rotary drive and to said rotary work positioning element to continuously rotate the latter in one direction, said work rotating drive having rotary output motion related to the rotary movement of said cam to produce a cumulative rotary displacement of said work positioning element in said one direction during an operating cycle which differs from a predetermined number of revolutions of the work positioning element by a rotary angle which is equal to or a multiple of the angular spacing between adjacent cuts to be made on the workpiece, said cam including a cam surface portion which coacts with said follower to move said one positioning element through a feeding stroke and which is shaped in relation to the output speed ratio of said work rotating drive relative to rotation of said cam to predetermine the lead in helical cuts produced during successive feeding strokes, and means for adjusting the pivotal connection between said link and said oscillatable element radially with respect to the pivotal axis of said oscillatable element to effect in the cut made in a workpiece a variation in the lead of the cut with reference to the cut lead predetermined by said cam.

9. An automatic machine for making on a workpiece a series of helical cuts evenly spaced circumferentially around the workpiece, comprising, in combination, a tool positioning element, a rotary work positioning element, cycling means coacting with one of said positioning elements to effect movement of the latter through successive operating cycles each of which translates said one positioning element from a starting position through a feeding stroke in relation to the other element followed by a return stroke to said starting position; said cycling means including a reciprocable element connected to said one positioning element for translating the latter reversibly, an oscillatable element supported for pivotal movement about a pivotal axis thereof, a power actuator coacting with said oscillatable element to oscillate the latter, and a connecting link pivotally connected between said reciprocable element and said oscillatable element; a work rotating drive synchronized with said power actuator of said cycling means and coacting with said rotary work positioning element to continuously rotate the latter in one direction, said work rotating drive having an output speed synchronized in relation to the speed of said cycling means to produce a predetermined lead in a cut made on a workpiece during a feeding stroke, said work rotating drive including first and second gears mating with each other for transmitting rotary motion to said work positioning element, means connecting said cycling means to said first gear for reversibly translating the latter relative to said second gear in a direction parallel to the axis of said second gear in synchronism with the translation of said one positioning element, one of said gears being elongated sufficiently to have continuous engagement with the other of said gears for all positions of said one element; said one gear being readily replaceable and having a helical lead which effects, as an incident to translation of said first gear relative to said second gear, a rotary displacement of said other gear relative to said one gear which is transmitted to said work positioning element to constitute a factor in the determination of the lead of the cut made in a workpiece; said cycling means and said work rotating drive being timed in relation to each other to effect during an operating cycle of said one positioning element a cumulative rotary displacement of said work positioning element which differs from a predetermined number of complete revolutions of the work positioning element by a rotary angle which is a proper fraction of a single revolution in which fraction the denominator is the number of the circumferentially spaced cuts to be made in the workpiece and the numerator is one or a number not a factor of the denominator, means for adjusting the pivotal connection between said connecting link and said oscillatable element radially with respect to the pivotal axis of said oscillatable element to effect a variation of said predetermined lead of the cut made on a workpiece, and shifting means synchronized with said cycling means and coacting with one of said positioning elements to effect positioning of the latter in a cutting position relative to the other positioning element during each feeding stroke and to effect displacement of said last mentioned one positioning element out of its cutting position relative to the other positioning element during each return stroke.

10. An automatic machine for making on a workpiece a series of helical cuts evenly spaced circumferentially around the workpiece, comprising, in combination, a tool positioning element, a rotary work positioning element, cycling means coacting with one of said positioning elements to effect movement of the latter through successive operating cycles each of which moves said one positioning element from a starting position through a feeding stroke in relation to the other positioning element followed by a return stroke to said starting position; said cycling means including a reciprocable element connected to said one positioning element for moving the latter reversibly, an oscillatable element supported for pivotal movement about a pivotal axis thereof, a power actuator coacting with said oscillatable element to oscillate the latter, and a connecting link pivotally connected between said reciprocable element and said oscillatable element; a work rotating drive synchronized with said power actuator of said cycling means and coacting with said rotary work positioning element to continuously rotate the latter in one direction, said work rotating drive having an output speed synchronized in relation to the speed of said cycling means to produce a predetermined lead in a cut made on a workpiece during a feeding stroke, said cycling means and said work rotating drive being timed in relation to each other to effect during an operating cycle of said one positioning element a cumulative rotary displacement of said work positioning element which differs from a predetermined number of complete revolutions of the work positioning element by an angle equal to a predetermined number of angular spacings between adjacent cuts of the circumferential series of cuts to be made on a workpiece, means for adjusting the pivotal connection between said connecting link and said oscillatable element radially with respect to the pivotal axis of said oscillatable element to effect a variation of said predetermined lead of the cut made on a workpiece, and shifting means synchronized with said cycling means and coacting with one of said positioning elements to effect positioning of the latter in a cutting position relative to the other positioning element during each feeding stroke and to effect displacement of said last mentioned one positioning element out of its cutting position relative to the other positioning element during each return stroke.

References Cited in the file of this patent

UNITED STATES PATENTS

| | | |
|---|---|---|
| 408,048 | Sheldon | July 30, 1889 |
| 882,290 | Bowen | Mar. 17, 1908 |
| 1,287,732 | Muller | Dec. 17, 1918 |
| 1,325,584 | Sattley et al. | Dec. 23, 1919 |
| 1,515,568 | Fleming et al. | Nov. 11, 1924 |

(Other references on following page)

UNITED STATES PATENTS

| | | |
|---|---|---|
| 1,673,489 | Bishop | June 12, 1928 |
| 1,789,544 | De Vlieg | Jan. 20, 1931 |
| 2,184,175 | Blake et al. | Dec. 19, 1939 |
| 2,191,777 | Stone | Feb. 27, 1940 |
| 2,212,179 | Martin | Aug. 20, 1940 |
| 2,330,921 | Rickenmann | Oct. 5, 1943 |
| 2,660,930 | De Vlieg | Dec. 1, 1953 |
| 2,799,976 | Gumphrey | July 23, 1957 |
| 2,814,236 | Burgsmuller | Nov. 26, 1957 |